Patented Aug. 18, 1942

2,293,413

UNITED STATES PATENT OFFICE 2,293,413

COATED METAL SURFACE

Frank R. Stoner, Jr., and Daniel M. Gray, Sewickley, Pa., assignors to Stoner-Mudge, Inc., Pittsburgh, Pa., a corporation of Pennsylvania No Drawing. Application September 24, 1940, Serial No. 358,106

2 Claims. (Cl. 117—132)

This invention relates to the coating of metal surfaces with thermoplastic resin. In Letters Patent of the United States 2,231,407, granted February 11, 1941, on the application of Wilbur W. Castor and Frank R. Stoner, Jr. (the latter being one of the present applicants), a product is described that consists of a single baked-on polarity-stratified coating in which the essential film-forming material, typically a copolymer of vinyl chloride and vinyl acetate, is underlaid with a material of more intense polarity concentrated at the metal interface. Such material of more intense polarity is, according to the teaching of that patent, one selected from a class known commercially as alkyd resins. The present invention is based on the discovery of another class of materials that, serving as the underlying layer, is most effective to the ends in view. The essential film-forming material with which the invention has to do is selected from a class consisting of the polymers and copolymers of vinyl alcohol, the lower aliphatic vinyl esters, vinyl halides, the lower aliphatic acrylic esters, the lower aliphatic methacrylic esters, acrylic nitrile, acrylamide, methacrylic nitrile, and methacrylamide.

For convenience, the term "lower" will be used throughout the specification and claims to designate aliphatic radicals containing no more than 6 carbon atoms. Thus, by "lower aliphatic vinyl ester" we mean vinyl formate, vinyl acetate, vinyl propionate, vinyl butyrate, and the higher aliphatic homologs containing up to 6 carbon atoms in the alkyl radical attached to the esterifying carboxyl group. By "lower aliphatic acrylic ester" we mean methyl acrylate, ethyl acrylate, propyl acrylate, butyl acrylate and the higher aliphatic homologs containing up to 6 carbon atoms in the esterifying alkyl group. Similarly, by "lower aliphatic methacrylic ester" we mean methyl methacrylate, ethyl methacrylate, propyl methacrylate, butyl methacrylate and the higher aliphatic homologs containing up to 6 carbon atoms in the esterifying alkyl group.

It will be understood that the term "polymer" as herein employed, and in the claims, will be inclusive of copolymers and interpolymers as well.

A general formula for all of the monomeric compounds capable of being polymerized into the thermoplastic polymers and copolymers contemplated in our invention is $$CH_2=CRX$$

in which R is selected from a group consisting of hydrogen and the methyl radical, and is invariably hydrogen except in the special case of the methacrylic derivatives, and X is selected from the group that consists of the halogens, the hydroxyl radical, the lower aliphatic monocarboxylic acyloxyl radicals, the lower alkyl carboxylate radicals, the nitrite radical, and the carboxylamide radical.

The specific relationship between R and X in each of the monomeric compounds contemplated is given in the following table.

| Typical compound | R | X |
|---|---|---|
| Vinyl alcohol | —H | —OH |
| Vinyl halide | —H | —F |
|  | —H | —Cl |
|  | —H | —Br |
|  | —H | —I |
| Vinyl ester | —H | —OCOH |
|  | —H | —OCOCH$_3$ |
|  | —H | —OCOC$_2$H$_5$ |
|  | —H | —OCOC$_3$H$_7$ |
|  | —H | —OCOC$_4$H$_9$ |
|  | —H | —OCOC$_5$H$_{11}$ |
|  | —H | —OCOC$_6$H$_{13}$ |
| Acrylic ester | —H | —COOCH$_3$ |
|  | —H | —COOC$_2$H$_5$ |
|  | —H | —COOC$_3$H$_7$ |
|  | —H | —COOC$_4$H$_9$ |
|  | —H | —COOC$_5$H$_{11}$ |
|  | —H | —COOC$_6$H$_{13}$ |
| Methacrylic ester | —CH$_3$ | —COOCH$_3$ |
|  | —CH$_3$ | —COOC$_2$H$_5$ |
|  | —CH$_3$ | —COOC$_3$H$_7$ |
|  | —CH$_3$ | —COOC$_4$H$_9$ |
|  | —CH$_3$ | —COOC$_5$H$_{11}$ |
|  | —CH$_3$ | —COOC$_6$H$_{13}$ |
| Acrylic nitrile | —H | —CN |
| Methacrylic nitrile | —CH$_3$ | —CN |
| Acrylic amide | —H | —CONH$_2$ |
| Methacrylic amide | —CH$_3$ | —CONH$_2$ |

The polymers and copolymers of these monomeric compounds are well known. They are derived by polymerization in the presence or absence of solvents for the monomeric substances, usually in the presence of peroxide catalysts or of actinic light. The degree of polymerization is usually controlled by varying the temperature, catalyst concentration, and concentration of monomer in solvent. For producing thermoplastic resins suitable for coating purposes, it is necessary to control the degree of polymerization between rather narrow limits. Thus, the degree of polymerization should not be too low, in that brittle, low melting, relatively unstable products results; the degree of polymerization should not be too high, in that insoluble or only slightly soluble, tough, rubbery products unsuited for coating compositions result. We prefer to use as our primary film-forming material polymers and copolymers those whose degree of polymerization is such that the molecular weight lies between 5000 and 50,000 as determined by the familiar Staudinger viscosity methods, and we most advantageously employ those whose average molecular weight lies between 10,000 and 20,000.

The composition of the copolymers may vary between relatively wide limits since it will be obvious that there is a distinct similarity in the atomic linkages which make up the actively polar group X in the general formula given above.

While we may employ any of the polymers and copolymers described above, we find the copolymers derived from the conjoint polymerization of vinyl chloride and vinyl acetate to be particularly suitable for our purpose, and we advantageously employ copolymers in which the percentage of vinyl chloride lies between 65% and 95% by weight, the percentage of vinyl acetate being correspondingly 35% and 5%. Several preferred compositions for our primary film-forming substance are as follows:

|     |                 | Per cent |
|-----|-----------------|----------|
| (a) | Vinyl chloride  | 80       |
|     | Vinyl acetate   | 20       |
| (b) | Vinyl chloride  | 87       |
|     | Vinyl acetate   | 13       |
| (c) | Vinyl chloride  | 85       |
|     | Vinyl acetate   | 15       |

These vinyl chloride-vinyl acetate copolymers are known to industry as Vinylite resins, and for convenience we shall use that designation throughout the specification when referring specifically to vinyl chloride-vinyl acetate copolymers.

In the coating of metal with thermoplastic resin it is established practice to bring the resin into solution, to spread the solution as a film upon the surface, and then to drive off the solvent. Practical considerations dictate the baking of the film-coated article. In order to effect even reasonably satisfactory adhesion it is requisite that the baking be done at a temperature ranging from 350° to 400° F. In the case of Vinylite, however (and this observation is applicable to any polymer or co-polymer that contains a vinyl halide as one of its monomeric constituents), it has been found that, when baked upon any of the commonly used metals, thermal decomposition sets in before a temperature of 350° is attained. Accordingly, when a coating of Vinylite upon any of these metals is desired, it has heretofore been found necessary, first to lay down upon the metal surface a priming cost of such a thermally stable substance as an oleo-resinous varnish, for example, and upon that priming coat to spread the Vinylite film. The Vinylite then, kept from immediate contact with the metal, will endure the requisite high temperature.

This invention consists in bringing into meta-stable solution with the Vinylite (or its equivalent) another substance, presently to be described, chosen because of more intense molecular polarity than Vinylite (and, accordingly, of superior adhesiveness), which other substance, when the film has been applied to the metal and while a condition of liquidity continues, will, by virtue of the meta-stable character of the solution and the more intense polarity of such other substance, seek the metal interface. It will concentrate at the metal interface, with displacement of the Vinylite outward to the air interface. The consequence and effect are that an integral but stratified coating is formed upon the metal surface; that the Vinylite, removed from immediate contact with the metal, may without breakdown be brought to the higher and optimum baking temperature; and that the underlying layer of the substance of more intense polarity will afford adhesion in higher degree. Conversely, it is true that, because of superior adhesion to the metal surface, the baking temperature need not be so high as otherwise would be requisite. Of the coating composition of the invention it may be said that in service it provides its own priming coating.

By the terms "polar" and "polarity," in this connection, we mean that property of a molecule which enables it to respond to a field of electric force and to align itself in a definite direction with relation to that field. And, for the sake of brevity and precision, we shall throughout the remainder of the specification and in the claims employ the term "molecular polarity" to designate this characteristic. The coating produced in the manner specified, and possessed of the characteristics described, we term a "polarity-stratified" coating.

Among the primary film-forming substances which we may employ are certain ones that at normal baking temperatures are thermally stable. Other considerations, however, may in particular cases enter in, to render the invention useful, when practised even upon them. For example, in certain standard practices, the inner surfaces of cans that are to serve as food containers are to be coated after fabrication, and the melting-point of solder becomes a limitation upon the permissible temperature of baking. But the melting-point of solder is lower than the optimum baking temperature of the primary film-forming material. Our invention then is available to afford, by the choice of our modified coating composition whose optimum baking temperature is low, a satisfactory product though the permissible baking temperature is less than the melting-point of solder.

Our modified coating compositions possess an added utility heretofore unknown to the prior art. While being capable of adequately adhering when the permissible baking temperature is low, they may also be exposed to extremely high temperatures without decomposition and loss of integrity if the time of exposure be short. This is a distinct advantage in the coating of metal sheets such as tinplate or black iron which are subsequently to be cut up and fabricated into containers having soldered seams. In the production of such containers "coated in the flat," it is necessary to provide a means for masking off that portion of the metal plate which is to later receive the solder, when applying coating compositions to the flat sheet. This arises from the fact that molten solder, striking the coating where the seaming is to be effected, cannot bring about a metal-to-metal bond. With the usual Vinylite coating compositions even this provision of a bare metal margin line to receive the solder does not enable satisfactory soldered containers to be fabricated after coating. The transfer of heat from the molten solder is sufficient to cause marked thermal decomposition in the neighborhood of the soldered seam. Our modified coating composition is not thus adversely affected by contact with molten solder. It does not decompose or degrade if the contact time does not exceed 5-7 seconds. (The usual contact time in soldering metal containers rarely exceeds 1-3 seconds.) Rather, it appears to liquify at the point of contact with the solder, permitting the solder to flow and properly bond to the metal; and on cooling the so heat-liquified coating sets again, presenting an integral film up to the solder line. And this unique property of our coating compositions makes it have great practical importance in the manufacture of coated soldered containers.

The added substance of more intense molecular polarity and superior adhesiveness which we employ is selected from a class known broadly as alkaline condensed non-oil-modified cresol-aldehyde resins. These resins are known to the art, and are derived from the reaction between certain alkyl- and aryl-substituted phenols, typically ortho-cresol, and an aldehyde, typically formaldehyde, in the presence of an alkaline catalyst, typically ammonia. The "cresol resins" which we find suitable to our purpose are distinguished from the familiar phenol-aldehyde resins of the usual heat-converting type by the fact that the phenolic bodies used in their preparation have only two reactive positions available for condensation in the parent benzene ring. Thus, resins prepared as hereinafter specified employing as the "phenolic body" o-cresol, p-cresol, p-phenyl phenol, and certain of the xylenols or mixtures of these, give the advantageous results contemplated in our invention. Resins prepared from phenolic bodies having more than two reactive positions available in the parent benzene ring are unsatisfactory. Confining attention to the cresols and xylenols, we have found that resins prepared as hereinafter specified from the following "bi-functional" phenolic bodies, alone or in admixture, are suitable for our purpose:

Cresols

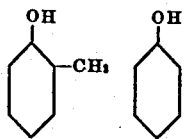

Xylenols

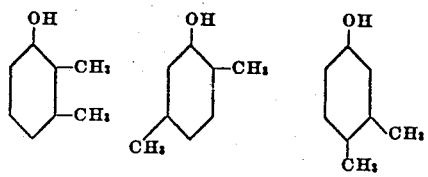

Resins prepared from the following "tri-functional" phenolic bodies are unsatisfactory in that they are generally completely incompatible with our thermoplastic primary film-forming substances, or precipitate out on standing, or are themselves unstable on aging, tending to condense further, even in solution:

Phenol          Cresols         Xylenols

 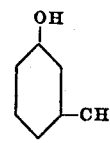 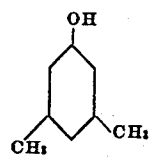

For convenience and precision, throughout the remainder of the specification and in the claims we shall designate our added substances of more intense molecular polarity as "non-oil-modified, alkaline condensed, bi-functional lower alkyl- and aryl-substituted phenol aldehyde resinoids." By the term "lower alkyl substituted" we mean to include only those alkyl groups containing no more than a total of 6 carbon atoms. By the term "lower aryl substituted" we mean to include only those aryl groups containing one benzene ring and its homologs containing up to a total of 6 carbon atoms in the substituting alkyl groups.

It will thus be understood that when we are dealing with resinoids derived from simple alkyl-substituted bi-functional phenols, the total number of carbon atoms in the alkyl groups attached to the parent phenolic nucleus may not exceed 6, and that these may form a single substituting alkyl group, or may be comprised within several smaller alkyl groups. Similarly, when we are dealing with resinoids derived from aryl-substituted bi-functional phenols, the total number of benzene groups attached to the parent phenolic nucleus may not exceed 1, and this single aryl group may itself be substituted with alkyl groups up to a total of 6 carbon atoms in the substituting alkyl groups.

This added substance must in preparation for our purposes be so carefully adjusted to the primary film-forming material (typically the copolymer of vinyl chloride, 87%, and vinyl acetate, 13%) that, though the two substances may be brought into homogeneous meta-stable solution in a mixture of ketones and aromatic hydrocarbons, they will, as the solvents evaporate, lose homogeneity; they will separate, and will arrange themselves within the still liquid film according to molecular polarity difference, as has been explained. Preparation of a typical so adjusted resin may be carried out as follows:

*Example 1*

To 240 grams (2 moles) of 90% o-cresol contained in a 1 liter 3-necked flask fitted with a thermometer, a reflux condenser, and a mechanical agitator are added 180 grams (2.4 moles) of 40% formaldehyde. Immediately thereafter 18.0 grams of 28% aqueous ammonia catalyst are added and the whole is brought to a temperature of 200–205° F. in 8 minutes by means of an externally heated oil bath. The reaction mixture is held at this temperature, with refluxing and vigorous agitation, for 6 hours, or until the mixture becomes too thick to be longer efficiently stirred. At this point the water separates as a distinct upper layer. The oil bath is then removed and the separated water decanted off. Immediately thereafter the still hot reaction mixture is steam distilled to remove excess ammonia and any unreacted formaldehyde and cresol. The steam distillation is continued for 40 minutes, or until the condensate becomes clear. The product remaining in the reaction vessel is then freed from excess water by decantation, and poured out into a suitable shallow tray for cooling and solidifying. Alternatively, it may be poured directly into an active solvent such as acetone, methyl isobutyl ketone, or isophorone, cyclohexanone, or similar ketone solvent. The solids content of such ketone solution should be adjusted to approximately 50% by weight of reaction product.

It will be perceived that herein is found a non-oil-modified, alkaline condensed, bi-functional lower alkyl-substituted phenol aldehyde resinoid, and it remains to say that, the proportions of the ingredients having been selected, the reaction time has been so controlled and the conditions have been so adjusted as to afford a resinous product that is compatible in solution with the primary film-forming material (Vinylite or its equivalent) when the solvent is a mixture of ketones and aromatic hydrocarbons, but it is a product that, as the solvent in the course of the industrial operation of coating evaporates, will tend increasingly to separate from the body-forming material, to segregate, and to concentrate at the metal interface, this without loss of integrity of the coating as a whole.

The more polar the primary film-forming material, the more polar must be the added resinoid in order that the two may be compatible in solution. In order to insure the requisite greater polarity for the substituted phenol aldehyde resinoid it is necessary to reduce the extent of the reaction somewhat in order that a resinoid of lower molecular weight may result. This is preferably accomplished by shortening the heating time to a minimum of 3½ hours, or alternatively, by increasing the ratio of aldehyde to phenolic body. If it be necessary to reduce the polarity of the desired resinoid, this is accomplished by decreasing the ratio of aldehyde to phenolic body, or to replace part or all of the exemplary o-cresol with another substituted phenol in which the substituting alkyl group is larger than the methyl group. Alternatively, a part or all of the o-cresol may be replaced by any one of the bi-functional xylenols previously described.

Several examples of such alternative preparations follow:

Example 2

Materials:

|  | Grams |
|---|---|
| Ortho tertiary amyl phenol (2 moles) | 328 |
| 40% formaldehyde (2.4 moles) | 180 |
| 28% ammonia | 18 |
| Heating time at 200–205° F hours | 6 |
| Steam distillation time minutes | 40 |

The product of Example 2 is of lower polarity than that of Example 1.

Example 3

Materials:

|  | Grams |
|---|---|
| 1, 4, 3 xylenol (1 mole) | 123 |
| 40% formaldehyde (1.1 moles) | 83 |
| 28% ammonia | 8 |
| Heating time at 200–205° F hours | 6 |
| Steam distillation time do | 1 |

The product of Example 3 is of lower polarity than that of Example 1.

Example 4

Materials:

|  | Grams |
|---|---|
| p-cresol (1 mole) | 108 |
| 40% formaldehyde (1.6 moles) | 120 |
| Ammonium carbonate | 12 |
| Heating time at 200–205° F hours | 4 |
| Steam distillation time minutes | 30 |

The product of Example 4 is of greater polarity than that of Example 1.

Example 5

Materials:

|  | Grams |
|---|---|
| o-cresol (1 mole) | 108 |
| Mixed xylenol cut, boiling range 210–215° C. (1 mole) | 123 |
| 40% formaldehyde (2.4 moles) | 180 |
| Barium hydroxide | 10 |
| Heating time at 200–205° F hours | 5½ |
| Steam distillation time do | 1½ |

The product of Example 5 is intermediate in polarity between that of Example 4 and that of Example 3.

Example 6

Materials:

|  | Grams |
|---|---|
| p-phenyl phenol (1 mole) | 170 |
| 40% formaldehyde (1.6 moles) | 120 |
| Potassium hydroxide | 10 |
| Heating time at 200–205° F hours | 4 |
| Steam distillation time do | 1 |

The product of Example 6 is of greater polarity than that of Example 1.

Example 7

Materials:

|  | Grams |
|---|---|
| p-(ortho secondary butyl phenyl) phenol (1 mole) | 226 |
| 40% formaldehyde (1.6 moles) | 120 |
| Sodium hydroxide | 7 |
| Heating time at 200–205° F hours | 5 |
| Steam distillation time do | 1½ |

The product of Example 7 is intermediate in polarity between Example 1 and Example 6.

In general, we have found that any non-oil-modified, alkaline condensed, bi-functional lower alkyl-substituted or aryl-substituted phenol aldehyde resinoid will serve our purpose in some degree. If the relative polarities of our primary film-forming substance and our added phenolic resinoid lie too far apart, an incompatibility in solution is early manifested. We may most simply determine the suitability of a given phenolic resinoid by preparing solutions with Vinylite (or its equivalent) in which the total solids content is 20 per cent by weight, and of which solids the phenolic resinoid is 10 per cent by weight. As solvent we use for these control experiments a mixture of equal volumes of methyl isobutyl ketone and toluol. If the so prepared solutions of phenolic resinoid and Vinylite are clear and free from flocculation after storing 24 hours at 68° F. the resinoid is known to be adequately balanced in polarity with reference to the primary film-forming substance.

We have experimented widely, and we find that the following limits adequately define those bi-functional phenolic resinoids which are satisfactory for the purposes of our invention:

| | |
|---|---|
| Molar ratio of aldehyde to phenolic body | 1.1/1 to 1.6/1 |
| Heating time at reflux temperatures hours | 3–7 |
| Steam distillation time minutes | 30–120 |

Our preferred resinoids are prepared with aldehyde-phenolic body ratios of 1.2–1.4 to 1, with reaction times of 5–6 hours, and steam distillation times of 40–80 minutes.

In the baking operation, that follows the spreading of the solution in the form of a film upon the metal surface to be coated, the bi-functional phenol aldehyde resinoid stratifies, as has been said, to the metal interface, and, under the influence of the elevated temperature, and as the solvent evaporates, undergoes the final stage of condensation, and becomes tightly adherent to the metal. It continues also in integral union with the overlying Vinylite. In this final stage the now completely reacted phenol-aldehyde resin becomes relatively impervious to attack by the usual solvents. Since it is protected by the overlying Vinylite from atmospheric degradation, it retains its high adhesiveness, together with the inertness that characterizes completely reacted heat-reactive resinous bodies.

The following exemplary procedures will illustrate the practice of our invention, it being understood that we are not limited to the materials of the examples, nor to the proportions there recited. All of the percentage compositions are on a weight basis.

Example 8

To 70 grams of a solution consisting of 53% xylol, 27% methyl n-amyl ketone, and 20% copolymer of vinyl chloride (87%) and vinyl acetate (13%) are added, with agitation, at room temperature, 30 grams of a solution consisting of 53% xylol, 27% methyl n-amyl ketone, and 20% of the o-cresol resinoid of Example 1. The resulting solution, the non-volatile portion of which consists of 70% thermoplastic copolymer (Vinylite) and 30% added o-cresol resinoid, is thinned to spraying consistency (approximately four parts of resin solution to one part of xylol) and is applied to the surface to be coated—a surface of tin or of steel, for example. A sheet of tinplate so coated may be baked for 15 minutes at 400° F. Examination then will reveal the fact that within the coating film stratification has occurred; that most of the o-cresol resinoid is concentrated beneath, and in immediate contact with the metal surface, and that a definite film of predominantly Vinylite resin overlies the o-cresol resin film. In consequence of such stratification, the coating will be found to be of superior adherence and of superior protective effect. It has in full measure the adhesive property of a coating of o-cresol resin alone, and the moisture-excluding and corrosion-resisting properties of a coating of Vinylite alone. Furthermore, under the circumstances described, the presence of the o-cresol resin has protective effect relative to the Vinylite, and the baking temperature requisite for best adhesion may be attained in a single coating operation without any disadvantageous decomposition of the Vinylite.

Example 9

To 100 grams of a solution consisting of 53% xylol, 27% mesityl oxide, and 15% copolymer of vinyl chloride (75%) and methyl acrylate (25%), are added 5 grams of the p-cresol reaction product of Example 4. The resulting solution, the non-volatile portion of which consists of 75% of primary film-forming substance (vinyl chloride methyl acrylate copolymer) and 25% of added p-cresol resinoid, is applied to an iron surface, for example, dried, and baked at a temperature of 475° F. for 10 minutes. It will be found that stratification has occurred; that the now completely reacted p-cresol resin is concentrated immediately upon the metal surface, and that a layer of the copolymer overlies it. The coating will be found to be superior in adhesion, moisture resistance and in flexibility.

Example 10

To 90 grams of a copolymer of vinyl chloride (80%), methyl methacrylate (5%) and ethyl acrylate (15%) dissolved in 100 grams of methyl isobutyl ketone and 300 grams of toluol, are added 100 grams of a solution containing 10 grams of the ortho tertiary amyl phenol aldehyde resinoid of Example 2, dissolved in 40 grams of isophorone and 50 grams of xylol. The resulting solution, the non-volatile portion of which consists of 90% of primary film-forming substance and 10 per cent of added ortho tertiary amyl phenol aldehyde resinoid, may be applied to a surface of brass, for example, and baked for 15 minutes at 350° F. The stratification described will have occurred and the coating will be found to be superior both in adhesion and in inertness to atmospheric degradation, moisture and other corrosive influences.

Our experiments show that blends containing as little as 1% by weight (based on the total solids) of non-oil-modified alkaline condensed, bi-functional lower alkyl-substituted or aryl-substituted phenol aldehyde resinoid give appreciable improvement in adhesion, and permit a substantial increase in permissible baking temperature. We find that the percentage of such phenol aldehyde resinoid may be as great as 40% of the total solids without too marked a decrease in the desirable properties of the resulting film. At these high ratios of phenolic resinoid to primary film-forming substance, however, there is evidence of incipient incompatibility in the films, and the blends are usually cloudy, subject to flocculation on long standing or on chilling, and are in general not preferred compositions. In our preferred compositions, the total solids consist of 20% of non-oil-modified, alkaline condensed, bi-functional lower alkyl- or aryl-substituted phenol aldehyde resinoid, and 80% of primary film-forming substance, typically Vinylite or its equivalent. While our experiments show that the permissible baking temperature is directly related to the percentage content of phenolic resinoid, other considerations enter in when the phenolic resinoid content exceeds the range of 35-40% as has been pointed out.

It remains to say that the choice of particular non-oil-modified, alkaline condensed, bi-functional lower alkyl- or aryl-substituted phenol aldehyde resinoid to accompany a given primary film-forming substance is dictated both by the temperature at which it is desired to bake, and by the molecular polarity of the primary film-forming substance. In general, we prefer to keep the amount of added phenolic resinoid at a minimum in our stratifying blends. This is most satisfactorily accomplished by choosing a phenolic resinoid having as great a relative molecular polarity as is consistent with compatibility and stability of the resulting blend. Thus, solutions of primary film-forming substance which will tolerate 25-30% of the resinoid of Example 4 without any evidence of cloudiness may tolerte 40-50% of the reinoid of Example 3, (the percentage figures being based on the total solids). Confining attention to the vinyl halide-vinyl ester primary film-forming substances, we find that as the percentage of vinyl halide in these copolymers is increased, the relative polarity of the added phenolic resinoid must be correspondingly decreased to permit satisfactory blending over the concentration range specified. Similarly, if we have to do with the acrylate and methacrylate types of polymers and copolymers as primary film-forming substances, the relative polarity of the added phenolic resinoid must be decreased as the groups attached to the acrylic or methacrylic polymeric chain successively are —CN, —CONH$_2$, —COOC$_6$H$_{13}$, ... —COOC$_2$H$_5$, COOCH$_3$. Our experiments indicate that the —OH group is intermediate between a halogen and an ester linkage in conferring polar characteristics upon a polymeric chain.

The order of polarity-conferring power of all of the substituent groups, X, in the general formula $$CH_2=CRX$$

is substantially as follows: —CN, —CONH$_2$, —OCOR', —COOR', —OH, —F, —Cl, —Br, —I. In the above list of substituent radicals R' stands for an alkyl group.

With this information, the proper choice of non-oil-modified, alkaline condensed, bi-functional lower alkyl-substituted phenol aldehyde resinoid to accompany a particular primary film-forming substance will be obvious to those skilled in the art.

And now, having described our invention and having shown the advantages attendant on its use, we claim as our invention:

1. A metal article whose surface is provided with a single baked-on polarity-stratified coating in which the essential film-forming material is a polymerized product of material selected from a group that consists of vinyl alcohol, the vinyl halides, the lower vinyl esters, the lower acrylic esters, the lower methacrylic esters, acrylic nitrile, methacrylic nitrile, acrylic amide, and methacrylic amide, and the material of more intense molecular polarity concentrated at the metal interface is a resinoid selected from a group that consists of the non-oil-modified, alkaline condensed, bi-functional, lower alkyl- and aryl-substituted phenol aldehyde resinoids.

2. A metal article whose surface is provided with a single baked-on polarity-stratified coating in which the essential film-forming material is a copolymer of vinyl chloride (65–99% by weight) and vinyl acetate (35–1%) and the material of more intense polarity that, concentrated at the metal interface, underlies the first-named material, is a resinoid selected from a group that consists of the non-oil-modified, alkaline condensed, bi-functional, lower alkyl- and aryl-substituted phenol aldehyde resinoids.

FRANK R. STONER, Jr.
DANIEL M. GRAY.

CERTIFICATE OF CORRECTION.

Patent No. 2,293,413.　　　　　　　　　　　　　　August 18, 1942.

FRANK R. STONER, JR., ET AL.

It is hereby certified that error appears in the printed specification of the above numbered patent requiring correction as follows: Page 1, second column, line 6, for "nitrite" read --nitrile--; page 5, second column, line 57, for "tolerte 40-50% of the reinoid" read --tolerate 40-50% of the resinoid--; and that the said Letters Patent should be read with this correction therein that the same may conform to the record of the case in the Patent Office.

Signed and sealed this 22nd day of September, A. D. 1942.

(Seal)　　　　　　　　　　　　　　　　　　　　　　　Henry Van Arsdale,
　　　　　　　　　　　　　　　　　　　　　Acting Commissioner of Patents.